United States Patent [19]

Zviak et al.

[11] 3,840,338
[45] Oct. 8, 1974

[54] LIGHT STABILIZED HAIR DYE COMPOSITIONS

[75] Inventors: Charles Zviak; Giuliana Ghilardi, both of Paris, France

[73] Assignee: L'Oreal, Paris, France

[22] Filed: Oct. 8, 1971

[21] Appl. No.: 187,874

Related U.S. Application Data

[63] Continuation of Ser. No. 815,501, April 11, 1969, abandoned.

[52] U.S. Cl. ......... 8/10.1, 8/10, 8/19, 424/DIG. 1, 424/DIG. 2, 424/47, 424/61, 424/71
[51] Int. Cl. .............................................. A61k 7/12
[58] Field of Search ......................................... 8/10.1

[56] References Cited
OTHER PUBLICATIONS
Chemical Abstracts, Vol. 17, Item 2391', 1923.
Comptes Rendas Académie Des Sciences, Vol. 176, pp. 45–49, 1923 (Haller et al.).
Beilstein, Vol. VII, 2nd Suppl. p. 346, 1948.
Wells et al., Cosmetics and the Skin, Reinhold Publishing Corp., N.Y., pp. 390–391, 1964.

*Primary Examiner*—Stanley J. Friedman
*Assistant Examiner*—Vera C. Clarke
*Attorney, Agent, or Firm*—Cushman, Darby & Cushman

[57] ABSTRACT

The use of benzylidene camphor to absorb ultraviolet light to stabilize hair dye compositions which contain hair dyeing compounds that are decomposed by exposure to light and cosmetic compositions that contain stabilizing amounts of this compound.

3 Claims, No Drawings

LIGHT STABILIZED HAIR DYE COMPOSITIONS

This application is a continuation of application Ser. No. 815,501 filed Apr. 11, 1969, now abandoned.

SUMMARY OF THE INVENTION

Dyes are extensively used in the cosmetics industry, not only in hair dyes, colored hair lacquers, shampoos, and colored setting lotions, but also in nail polishes and tinted creams.

These compositions may take the form of solutions, emulsions, gels, suspensions, or dispersions, and they are commonly packed in clear glass or transparent plastic bottles. Hair lacquers, in particular, are frequently marketed in transparent spray bottles which permits the user to see the color of the lacquer.

The composition is thus exposed to the light while being stored or used.

Unfortunately, the dyes are not sufficiently stable when subjected to light rays. This is particularly true of triphenylmethane derivatives, (such as crystal violet, methyl violet, methyl green) which represent a very valuable range of colors, but have the disadvantage that they are rapidly destroyed by light. There are also a number of other dyes which are stable at certain concentrations, which are markedly photosensitive when highly diluted.

On the other hand, it frequently happens that colorless compositions, such as colorless nail polishes alter and turn yellowish after prolonged exposure to the light.

It follows that these compositions, whether colored or colorless, cannot be stored for more than a certain length of time, which is usually a few weeks.

In order to overcome this problem it has been suggested that a substance capable of filtering out light rays be incorporated in these compositions.

However, while the protective filtering substances heretofore used to increase the length of time for which such compositions may be stored, they do not stabilize them for more than a certain length of time which varies with the nature and degree of concentration of the dye, but which rarely exceeds two months.

Applicants have, however, discovered that the length of time for which these cosmetic compositions may be stored can be considerably increased by incorporating therein a camphor derivative consisting of benzylidene camphor, or 1, 7, 7-trimethyl-3-benzylidene-2-bicyclo [2, 2, 1] heptanone, which has the formula:

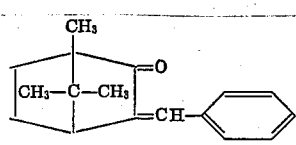

This compound, in the pure form, is a white crystalline powder, having a melting point of 76°–78°C, which is only slightly soluble in water, but is readily soluble in such conventional organic solvents as ethanol, isopropanol, acetone and ethyl acetate. Solutions of this compound form a very strong absorption bank in the ultraviolet range.

It is accordingly an object of the present invention to provide a new method of protecting cosmetic compositions which are decomposed by exposure to light, which method is essentially characterized by the fact that benzylidene camphor is incorporated in these compositions.

In a preferred method of carrying out the process according to the invention, benzylidene camphor is incorporated in these compositions in the proportion of 0.05 to 2 percent by weight.

It is also an object of the present invention to provide as a new article of manufacture a cosmetic composition characterized by the fact that it contains benzylidene camphor.

The compositions according to the invention may be colorless or colored and take the form of solutions in conventional solvents such as water, the usual alcohols such as ethanol and isopropanol, acetone and ethyl acetate, or of emulsions, gels, suspensions or dispersions.

Advantageously, these compositions contain 0.05 to 2 percent be weight of benzylidene camphor.

They may also contain any ingredients conventionally included in cosmetic compositions, such as swelling agents, thickeners, emulsifiers, surface-active agents, bleaches, film-forming substances, and perfumes.

The compositions according to the invention may be hair treating products such as dyes, lacquers, shampoos, or setting lotions, fingernail polishes or fluid creams.

They may be packaged in aerosol dispensers.

Tests made by applicants have shown that the compositions according to the invention may be stored in transparent bottles for more than 6 months without any resulting change in the composition.

The following examples are given purely by way of example; without any suggestion that the scope of the invention is limited to the details thereof.

EXAMPLE 1

The following colored hair softening lotion is prepared:

| | |
|---|---|
| vinylpyrrolidone/vinyl acetate copolymer sold under the trademark "P.V.P./V.A.S. 630" by General Aniline | 0.5 g |
| ethanol q.s.p. 50 | |
| methyl violet (Color Index No. 42,535) | 0.0015 g |
| benzylidene camphor | 0.1 g |
| triethanolamine, q.s.p. pH 7 | |
| water, q.s.p. | 100 g |

This solution, when stored in a colorless glass container and exposed to the sun, retains its color and coloring power perfectly, even after 6 months. In the absence of the filtering compound, the composition keeps only 3 weeks. If other filtering compounds are used, they will keep for only 8 weeks.

EXAMPLE 2

The following colored setting lotion is prepared:

| | | |
|---|---|---|
| vinyl acetate/crotonic acid copolymer | 1 | g |
| vinyl acetate/vinylpyrrolidone copolymer | 0.5 | g |
| brilliant rose "Cibacete 4 BN" (Color Index No. 62,015) | 0.001 | g |
| benzylidene camphor | 0.2 | g |
| triethanolamine, q.s.p. pH 7 | | |
| alcohol, q.s.p. 50 | | |
| water, q.s.p. | 100 | g |

When this solution is stored in a clear glass container and exposed to the sun it retains its color and coloring power perfectly at the end of 6 months. When this solution is not stabilized, its color and coloring power disappear at the end of 2 weeks, and when stabilized by other filtering compounds, they disappear at the end of 7 weeks.

EXAMPLE 3

The following colored hair lacquer was prepared:

| | |
|---|---|
| maleic anhydride/methylvinyl ether copolymer sold under the trademark "Gantrez AN 3953" by General Aniline | 2.5 g |
| triethanolamine, q.s.p. | pH 7 |
| benzylidene camphor | 0.1 g |
| "Orasol Blue BLW" (Color Index Solvent Blue 10 C.I. 50315) | 0.5 g |
| ethanol, q.s.p. | 100 g |

25 g of this solution were introduced into a clear glass aerosol dispenser, in which the following are added:

| | |
|---|---|
| Freon 11 | 47 g |
| Freon 12 | 28 g |

This solution keeps in an entirely satisfactory manner when exposed to the light.

At the end of 4 months the solution had not changed color. Without a protective filter, the color weakens substantially at the end of 8 weeks, and when other filtering compounds are tried they begin to weaken at the end of 15 days.

This last test shows that the filters used for purposes of comparative tests are not compatible with certain dyes, such as "Blue Orazol BLW", which they tend to destroy. This is not the case with benzylidene-camphor, which therefore has a larger field of application.

EXAMPLE 4

The following setting lotion is prepared:

| | |
|---|---|
| resin sold under the trademark "PVP K 30" by General | 2 g |
| ethyl alcohol, q.s.p. | 40° |
| "Blue Orasol BLW" (Ciba) (Color Index Solvent Blue No. 10 C.I. 50315) at a concentration of 0.05% in a 50° alcoholic solution | 0.8 cm³ |
| benzylidene camphor | 0.05 g |
| water, q.s.p. | 100 cm³ |

EXAMPLE 5

The following setting lotion is prepared:

| | |
|---|---|
| resin 28.13.10 (Sold by National Starch Co.) | 2.5 g |
| aminoethyl propane diol | 0.25 g |
| ethyl alcohol, q.s.p. | 50° |
| "Neolane Rose BA" (Ciba) in 1% solution | 0.5 cm³ |
| benzylidene camphor | 0.2 g |
| water, q.s.p. | 100 cm³ |

EXAMPLE 6

The following hair softening lotion is prepared:

| | |
|---|---|
| "PVP/VA S 630" (General Aniline) | 4 g |
| "Blue sky acid alizarine B" (Francolor) in 0.05% solution | 3 cm³ |
| benzylidene camphor | 0.1 g |
| ethyl alcohol, q.s.p. | 40° |
| water, q.s.p. | 100 cm³ |

EXAMPLE 7

The following setting lotion is prepared:

| | |
|---|---|
| "PVP K 30" (General Aniline) | 1 g |
| resin 28.13.10 (National Starch Co.) | 1 g |
| aminoethyl propanol | 0.1 g |
| ethyl alcohol, q.s.p. | 50° |
| "FDC Green No. 3" (Color Index No. 42,053) in 0.1% solution | 0.5 cm³ |
| benzylidene camphor | 0.5 g |
| water, q.s.p. | 100 cm³ |

EXAMPLE 8

The following shampoo composition is prepared:

| | |
|---|---|
| Technical (100%) triethanolamine lauryl sulfate | 10 g |
| monoethanolamide of copra oil | 1.5 g |
| "isopropylan 33" (Robinson Wagner Co.) | 1 g |
| carboxymethylcellulose | 0.25 g |
| benzylidene camphor | 0.1 g |
| perfume cinnamic alcohol | 0.25 g |
| "Erioglaucine A" or "FDC Blue No. 1" (Color Index No. 42,090) in an aqueous 1% solution | 0.2 g |
| Water, q.s.p. | 100 g |

EXAMPLE 9

The following shampoo composition is prepared:

| | |
|---|---|
| Technical (100%) diglycol ether sodium sulfate | 8 g |
| lauric diethanolamide | 3 g |
| polyethylene glycol distearate | 2 g |
| hexachlorophene | 0.5 g |
| benzylidene camphor | 0.1 g |
| perfume Rose essence | 0.2 g |
| "FDC Green No. 3" (Color Index No. 42,053) in a 1% aqueous solution | 0.5 g |
| water, q.s.p. | 100 g |

All these compositions have an excellent stability to light.

In examples 1 and 6 "PVP/VA S 630" is a vinylpyrrolidone/vinyl acetate copolymer that contains 70 percent vinyl pyrrolidone and 30 percent vinyl acetate and has a molecular weight of 40,000 to 160,000 and a viscosity in a 25 percent by weight ethanol solution of 100 centipoise. In example 2, the first polymer contained 90 percent vinyl acetate, 10 percent crotonic acid and had a molecular weight of about 50,000; the second copolymer contained 30 percent vinyl acetate, 70 percent vinyl pyrrolidone and had a molecular weight of about 50,000. In example 3, "Gantrez AN 3953" has a viscosity of 0.5 centipoise in an aqueous solution containing 25 percent by weight of said copolymer. In examples 4 and 7, "PVP K 30" is a polyvinylpyrrolidone copolymer having a molecular weight of about 40,000 and a viscosity of 2.4 centipoise in a 5 percent by weight aqueous solution. In examples 5 and 7, resin "28.13.10" is a copolymer containing 90 percent vinyl acetate, 10 percent crotonic acid and has a molecular weight of about 50,000. In example 8, "Isopropylan 33" is lanoline that is 67 percent transesterified with isopropanol and contains 33 percent free unreacted lanoline.

To more completely identify the hair dyes used in examples 1 to 9 it may be noted that "Neolane Rose BA" is Cl Acid Red 186, color Index No. 18,810 having the formula

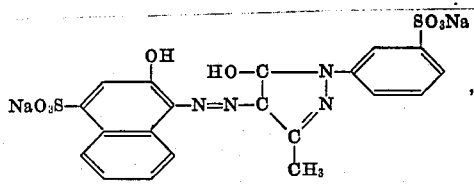

and "Blue Sky acid alizarine B" is Cl Acid Blue 78, Color Index No. 62,105 having the formula

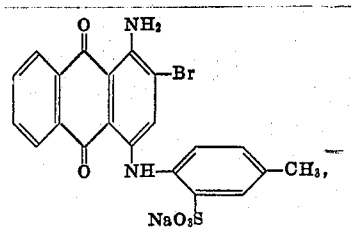

brilliant rose "Cibacete 4 BN" (C. I. No. 62,015) has the formula

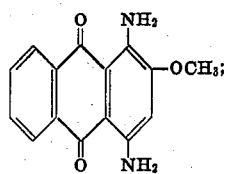

"Orasol Blue BLW" (C. I. 50315) has the formula

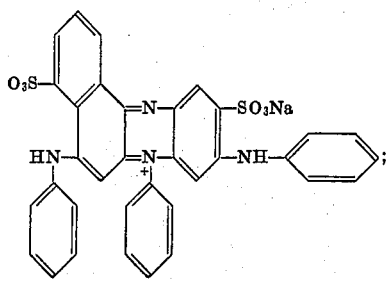

FDC Green No. 3 (C. I. No. 42,053) has the formula

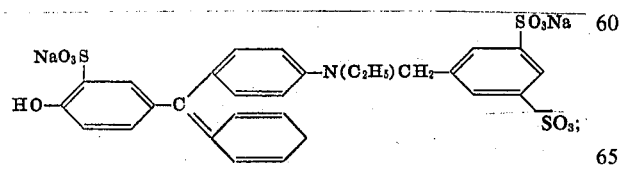

and FDC Blue No. 1 (C. I. No. 42,090) has the formula

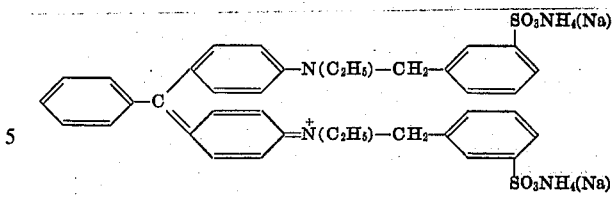

Some of the prior art filtering compounds that were tested and began to weaken at the end of 15 days referred to in example 3 are Parsol Ultra of Givaddan, Solproter 2 hydro of Firmenich; Domekos WL 334 of Dorily and Tenuvin of CIBA.

Benzylidene camphor and methods of making it are known. For example it is discussed in Beilstein Volume VII–VII, pages 609 and 890, and in Volume VII 2nd supplement, page 346; and "Chimie Organic" by Gregnard, Volume XVI, pages 209 and 238. One method of making this compound is the Haller method which reacts an aromatic aldehyde with sodium camphor or sodium borneol.

The cosmetic compositions may contain conventional anionic, cationic and anionic emulsifiers, such as magnesium or aluminum stearate, alkyl sulphates, such as sodium lauryl sulphate, cetyl alcohol, cetyl trimethyl ammonium bromide, salts of diethylaminoethyloleylamide; Spans, Tweens, polyethylene glycols, especially those having a molecular weight between 200 and 3,000, etc. Many others are listed in Emulsions-Theory and Practice, Reinhold, Schwartz and Perry (1957). Thickening agents such as gelling agents that may be used include for example high concentrations of emulsifying agents, mixtures of fatty alcohol and alkyl sulphates, such as lauryl sulphate and cetyl alcohol, ammonium salts of a fatty alcohol-polyoxyethyl sulfate derivatives, such as $C_{17}H_{33}(OC_2H_5)_5OH$, gelatin, pectin, Agar-Agar gum; polyethylene glycols having molecular weights above 100,000, etc.; suspension agents such as ethyl ammonium chloride, propyl ammonium sulphate, etc. and dispersing agents such as lecithine, carboxymethyl cellulose, etc.

Our tests have indicated that a wide variety of hair dyes are stabilized by benzylidene camphor and all the dyes that we have tested have been stabilized with this compound. Hair dyes that may be used in the hair dye compositions of this invention include azo hair dyes, such as 4,2'4'6' tetrahydroxy azobenzene, nitro hair dyes, such as N-methyl 4-amino-4-nitro N-β amino ethyl-1-amino benzene, anthraquinone hair dyes, such as 1-amino propyl amino anthraquinone, triphenyl methane dyes, much as

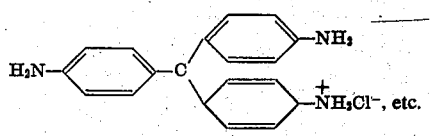

Hair lacquer compositions containing the compositions of this invention would contain lacquering amounts of a hair lacquering resin such as the polyvinylpyrrolidone in alcoholic solution described in U.S. Pat. No. 2,871,161, and copolymers of polyvinylpyrrolidone and vinyl acetate, vinyl propionate, etc., phenyl maleic-methyl anhydride copolymers, etc.

The shampoo ingredient of the compositions of this invention could be any shampoo compound such as anionic detergents, such as lauryl sulfonate, heptadecane benzene sulphonate, fatty acid soaps, Turkey oil, etc., alkyl ether sulphates, cationic detergents, such as quaternary ammonium salts, such as lauryl trimethyl ammonium sulfate, octadecane pyridinium sulfate, quaternized amides, nonionic detergents, such as fatty alcohol- polyethers such as lauryl ethoxides, etc., polyethoxy lauryl amide, polyethers of ethylene glycol, etc.

The hydratant milk or cream fluid compositions would contain carriers such as vaseline, paraffin oil, lanolin, microcrystalline wax, etc.

The polyethylene glycol distearate used in example 9 had a molecular weight of from 1,000 to 3,000.

The fingernail polish according to the invention may contain, in addition to one of the dyes given in the foregoing examples, nitrocellulose, acetone, dibutyl phthalate, benzylidene camphor, ethyl acetate, butyl acetate, butanol, xylene, and toluene, in proportions which may be varied in accordance with principles well known to those skilled in the art.

What is claimed is:

1. A hair dye composition comprising a solution in a solvent selected from the group consisting of water, ethanol and isopropanol of a hair dye selected from the group consisting of 4, 2', 4', 6'-tetrahydroxyazobenzene, N-methyl-4-amino-4-nitro-N-β-aminoethyl-1-amino benzene, 1-amino propylamino anthraquinone,

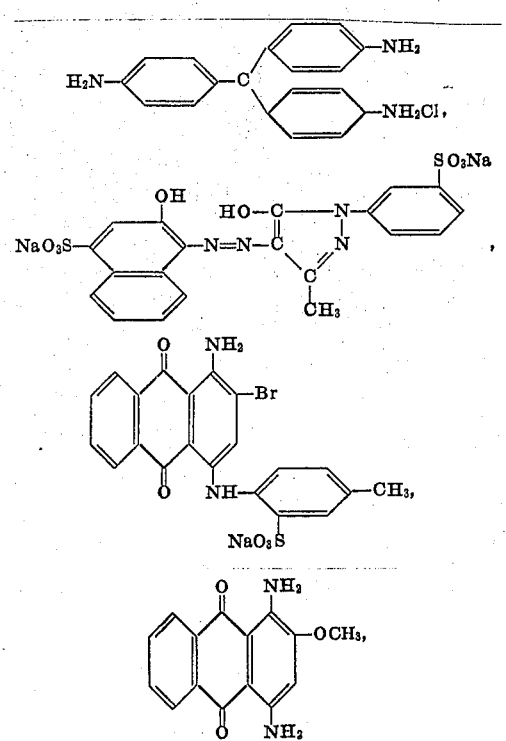

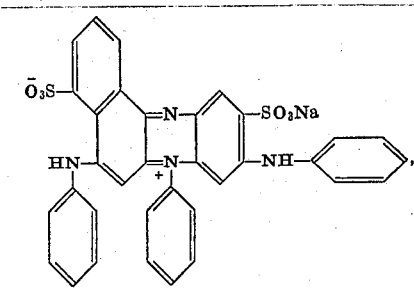

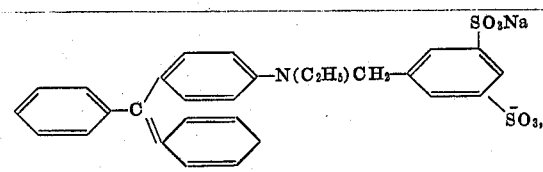

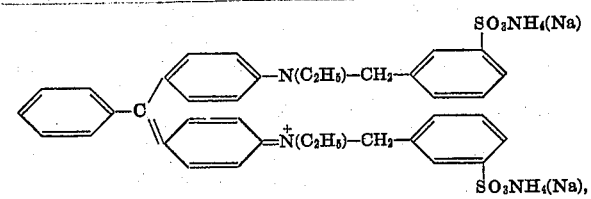

crystal violet, methyl violet and methyl green, present in amounts effective to color hair, said hair dye being susceptible to decomposition by exposure to ultra-violet light and as an effective ultra-violet light absorbing agent benzylidene camphor having the formula

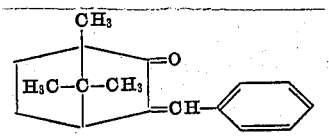

present in amounts of 0.05–2 percent by weight of said composition.

2. The hair dye composition of claim 1 wherein said hair dye is selected from the group consisting of crystal violet, methyl violet and methyl green.

3. The hair dye composition of claim 1 which also includes film-forming amounts of a member selected from the group consisting of
   a. 70 percent vinyl pyrrolidone/30 percent vinyl acetate copolymer having a molecular weight of 40,000–160,000,
   b. 90 percent vinyl acetate/10 percent crotonic acid copolymer having a molecular weight of about 50,000,
   c. 30 percent vinyl acetate/70 percent vinyl pyrrolidone copolymer having a molecular weight of about 50,000, and
   d. polyvinylpyrrolidone having a molecular weight of about 40,000 and a viscosity of 2.4 centipoises in a 5 weight percent aqueous solution.

* * * * *

UNITED STATES PATENT OFFICE
CERTIFICATE OF CORRECTION

Patent No. 3,840,338      Dated October 8, 1974

Inventor(s) Charles Zviak and Giuliana Ghilardi

It is certified that error appears in the above-identified patent and that said Letters Patent are hereby corrected as shown below:

In the Heading, please add --

[30] Foreign Application Priority Data
    March 18, 1968 Luxembourg 55702 --

Signed and sealed this 22nd day of April 1975.

(SEAL)
Attest:

RUTH C. MASON
Attesting Officer

C. MARSHALL DANN
Commissioner of Patents
and Trademarks